United States Patent
Dalmatov

(10) Patent No.: US 11,461,287 B2
(45) Date of Patent: Oct. 4, 2022

(54) MANAGING A FILE SYSTEM WITHIN MULTIPLE LUNS WHILE DIFFERENT LUN LEVEL POLICIES ARE APPLIED TO THE LUNS

(71) Applicant: EMC IP Holding Company LLC, Hopkinton, MA (US)

(72) Inventor: Nickolay Alexandrovich Dalmatov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 1010 days.

(21) Appl. No.: 16/097,761

(22) PCT Filed: Oct. 26, 2017

(86) PCT No.: PCT/RU2017/000787
§ 371 (c)(1),
(2) Date: Oct. 30, 2018

(87) PCT Pub. No.: WO2019/083389
PCT Pub. Date: May 2, 2019

(65) Prior Publication Data
US 2021/0224232 A1   Jul. 22, 2021

(51) Int. Cl.
*G06F 7/02* (2006.01)
*G06F 16/00* (2019.01)
(Continued)

(52) U.S. Cl.
CPC .......... *G06F 16/185* (2019.01); *G06F 3/0604* (2013.01); *G06F 3/0631* (2013.01);
(Continued)

(58) Field of Classification Search
CPC .. G06F 16/185; G06F 16/119; G06F 16/1748; G06F 3/0604; G06F 3/0631; G06F 3/0676; G06F 3/0679
See application file for complete search history.

(56) References Cited

U.S. PATENT DOCUMENTS 5,345,584 A   9/1994 Hill
5,734,861 A   3/1998 Cohn et al.
(Continued)

FOREIGN PATENT DOCUMENTS

RU   2235356   8/2004
WO   20160072971   5/2016

OTHER PUBLICATIONS

International Search Report and the Written Opinion from International Searching Authority (RU) for International Application No. PCT/RU2017/000787, dated Jun. 21, 2018, 8 pages.
(Continued)

*Primary Examiner* — Bruce M Moser
(74) *Attorney, Agent, or Firm* — BainwoodHuang

(57) ABSTRACT

A technique manages file data of a file system. The technique involves provisioning a first LUN with slice locations from a heterogeneous storage pool created from a solid state device (SSD) storage tier formed from SSD memory and a hard disk drive (HDD) storage tier formed from HDD memory. The technique further involves provisioning a second LUN with slice locations from the heterogeneous storage pool. The technique further involves, while different LUN level policies are applied to the first LUN and the second LUN, moving file data of a file system from the slice locations of the first LUN to the slice locations of the second LUN. Such a technique enables effective auto-tiering at the file level where active file data moves to a higher performance storage tier and inactive file data moves to a cost (Continued)

effective lower performance storage tier thus optimizing operation.

20 Claims, 6 Drawing Sheets

(51) Int. Cl.
*G06F 16/185* (2019.01)
*G06F 16/11* (2019.01)
*G06F 16/174* (2019.01)
*G06F 3/06* (2006.01)

(52) U.S. Cl.
CPC .......... *G06F 3/0676* (2013.01); *G06F 3/0679* (2013.01); *G06F 16/119* (2019.01); *G06F 16/1748* (2019.01)

(56) References Cited

U.S. PATENT DOCUMENTS

| | | | |
|---|---|---|---|
| 6,173,306 | B1 | 1/2001 | Raz et al. |
| 8,706,960 | B1 | 4/2014 | Ives et al. |
| 8,935,493 | B1 | 1/2015 | Dolan et al. |
| 9,128,629 | B1 * | 9/2015 | Mao ................. G06F 3/067 |
| 9,311,002 | B1 | 4/2016 | Scott et al. |
| 9,330,105 | B1 | 5/2016 | Duprey et al. |
| 9,383,940 | B1 | 7/2016 | Ives et al. |
| 9,594,514 | B1 | 3/2017 | Bono et al. |
| 9,684,593 | B1 | 6/2017 | Chen et al. |
| 9,697,226 | B1 * | 7/2017 | Youngworth ......... G06F 3/0607 |
| 9,703,664 | B1 | 7/2017 | Alshawabkeh et al. |
| 9,940,033 | B1 | 4/2018 | Alshawabkeh et al. |
| 9,965,218 | B1 | 5/2018 | Martin et al. |
| 10,025,523 | B1 | 7/2018 | Dagan et al. |
| 10,073,621 | B1 | 9/2018 | Foley et al. |
| 10,078,569 | B1 | 9/2018 | Alshawabkeh et al. |
| 10,089,026 | B1 | 10/2018 | Puhov et al. |
| 10,095,425 | B1 | 10/2018 | Martin |
| 10,126,988 | B1 | 11/2018 | Han et al. |
| 10,140,041 | B1 | 11/2018 | Dong et al. |
| 10,146,447 | B1 | 12/2018 | Dong et al. |
| 10,146,456 | B1 | 12/2018 | Gao et al. |
| 10,146,459 | B1 | 12/2018 | Gao et al. |
| 10,146,624 | B1 | 12/2018 | Gong et al. |
| 10,146,646 | B1 | 12/2018 | Foley et al. |
| 10,152,254 | B1 | 12/2018 | Kang et al. |
| 2002/0095532 | A1 | 7/2002 | Surugucchi et al. |
| 2003/0065883 | A1 | 4/2003 | Bachmat |
| 2005/0114438 | A1 * | 5/2005 | Bendich ................. G06F 3/0665 709/203 |
| 2006/0161807 | A1 | 7/2006 | Dawkins |
| 2006/0212746 | A1 | 9/2006 | Amegadzie et al. |
| 2008/0028164 | A1 | 1/2008 | Ikemoto et al. |
| 2008/0059749 | A1 | 3/2008 | Gerber et al. |
| 2008/0109601 | A1 | 5/2008 | Klemm et al. |
| 2010/0250501 | A1 | 9/2010 | Mandagere et al. |
| 2011/0153931 | A1 * | 6/2011 | Bell, Jr. ................. G06F 16/122 711/E12.019 |
| 2012/0259901 | A1 | 10/2012 | Lee et al. |
| 2013/0275653 | A1 | 10/2013 | Ranade et al. |
| 2014/0095439 | A1 | 4/2014 | Ram |
| 2015/0134926 | A1 | 5/2015 | Yang et al. |
| 2016/0188401 | A1 | 6/2016 | Shen et al. |
| 2016/0364149 | A1 | 12/2016 | Klemm et al. |
| 2017/0285972 | A1 | 10/2017 | Dalmatov |
| 2018/0365281 | A1 * | 12/2018 | Patel ....................... G06F 16/13 |

OTHER PUBLICATIONS

EMC, "EMC Celerra Automated Storage Tiering Applied Best Practices Guide", Aug. 2009, P/N h6499, pp. 1-36.
EMC, "EMC VNX@ Unified Best Practices for Performance Applied Best Practice Guide", Oct. 2005, P/N H10938.8, pp. 1-37.
EMC, "Managing Data Relocation in Storage Systems", U.S. Appl. No. 13/929,664, filed Jun. 27, 2013.
Tomek, "EMC VNX-Fast VP Explained—Storage Freak", retrieved from http://www.storagefreak.net/2014/06/emc-vnx-fast-vp-explained, Jun. 2, 2014, pp. 1-6.

* cited by examiner

MANAGING A FILE SYSTEM WITHIN MULTIPLE LUNS WHILE DIFFERENT LUN LEVEL POLICIES ARE APPLIED TO THE LUNS

BACKGROUND

Conventional data storage systems maintain host data on behalf of host computers. Some conventional tiered data storage systems store host data in different tiers such as a tier of flash memory and another tier of magnetic disk drive memory.

To store host data in different tiers of such a tiered data storage system, a logical unit of storage (LUN) is initially provisioned with unused storage slices (i.e., available memory locations) from the different tiers. Then, a tiering policy is applied that determines how host data is written to the unused storage slices of the LUN. Such a tiering policy may further dictate how slices of the written host data are later re-located to other storage slices of the LUN (i.e., re-positioned within the different tiers) based on the activity level of each slice of written host data.

SUMMARY

Unfortunately, there are deficiencies to the above-described conventional tiered data storage system which simply re-locates slices of written host data based on slice activity level. For example, suppose that the above-described conventional tiered data storage system applies a particular tiering policy to a logical unit of storage (LUN), and that the particular tiering policy re-locates the most active slices of written host data to a tier of flash memory and the least active slices of written host data to a tier of magnetic disk drive memory. Further suppose that the LUN stores a file system where, on average, each slice of written host data contains one or two very active files and several inactive files.

Since each slice of written host data may appear to be highly active due to the presence of a small number of very active files within that slice, the conventional tiered data storage system may try to locate all of the slices to the tier of flash memory and none of the slices to the tier of magnetic disk drive memory. In such a situation, the tier of magnetic disk drive memory will go underutilized while the storage capacity of tier of flash memory may become exhausted. Accordingly, the conventional tiered data storage system is ineffective in applying the tiering policy to a LUN that holds a file system.

In contrast to the above-described conventional tiered data storage system in which application of a tiering policy to a single LUN is ineffective in supporting a file system within different tiers, improved techniques are directed to managing file data of a file system within multiple LUNs while different LUN level policies are applied to the LUNs. For example, a first policy may be applied to a first LUN which prefers storing active (or "hot") slices in a high performance storage tier. Additionally, a second policy may be applied to a second LUN which prefers storing slices of data in the lowest available tier for cost effectiveness. Furthermore, active files of the file system can remain intact and can be placed within the first LUN for quick access, and inactive files of the file system can be replaced with stub files which are placed in the first LUN and content files which are placed in the second LUN. With the content files containing the content from the inactive files, and with the stub files pointing to (or identifying) the content files as well as representing the inactive files, the overall structure of the file system remains intact. Moreover, slices of data containing active file data move naturally to the high performance storage tier and slices of data containing inactive file data move naturally to the lowest available tier thus optimizing operation.

One embodiment is directed to a method which is performed in a data storage system. The method involves managing file data of a file system. The method includes provisioning a first LUN with slice locations from a heterogeneous storage pool created from a solid state device (SSD) storage tier formed from SSD memory and a hard disk drive (HDD) storage tier formed from HDD memory. The method further includes provisioning a second LUN with slice locations from the heterogeneous storage pool. The method further includes, while different LUN level policies are applied to the first LUN and the second LUN, moving file data of a file system from the slice locations of the first LUN to the slice locations of the second LUN. Such a technique enables effective auto-tiering at the file level.

In some arrangements, the method further includes, prior to moving the file data of the file system from the slice locations of the first LUN to the slice locations of the second LUN, initiating application of (i) a first data slice relocation policy to the first LUN to move data slices of the first LUN among the SSD storage tier and the HDD storage tier and (ii) a second data slice relocation policy to the second LUN to move data slices of the second LUN among the SSD storage tier and the HDD storage tier. The first data slice relocation policy and the second data slice relocation policy are the different LUN level policies that are applied to the first LUN and the second LUN.

In some arrangements, initiating application of the first data slice relocation policy to the first LUN includes applying, to the first LUN, a first set of rules that prioritizes minimizing access time for accessing data slices over minimizing cost for storing data slices. Additionally, initiating application of the second data slice relocation policy to the second LUN includes applying, to the second LUN, a second set of rules that prioritizes minimizing cost for storing data slices over minimizing access time for accessing data slices.

In some arrangements, moving the file data of the file system from the slice locations of the first LUN to the slice locations of the second LUN includes ascertaining activity levels of files of the file system, and conveying the file data from the slice locations of the first LUN to the slice locations of the second LUN based on the ascertained activity levels.

In some arrangements, ascertaining the activity levels of files of the file system includes, for each file of the file system, comparing a time in which that file was last accessed to a threshold, labeling that file as "hot" when the time is less than the threshold, and labeling that file as "cold" when the time is greater than the threshold.

In some arrangements, conveying the file data from the slice locations of the first LUN to the slice locations of the second LUN includes, for particular files that are labeled "cold", creating stub files and content files from the particular files and, in place of the particular files, placing the stub files in the first LUN and placing the content files in the second LUN while files that are labeled "hot" remain in the first LUN.

In some arrangements, conveying the file data from the slice locations of the first LUN to the slice locations of the second LUN includes, for a particular file that is labeled "cold", creating a stub file and a content file from the particular file and, in place of the particular file, placing the stub file in the first LUN and placing the content file in the second LUN, the stub file being operative to identify the content file, and the content file containing content of the particular file.

In some arrangements, the method further includes, before the content file containing the content of the particular file is placed in the second LUN, performing a deduplication operation to deduplicate the content of the particular file.

In some arrangements, the method further includes, before the content file containing the content of the particular file is placed in the second LUN, performing a compression operation to compress the content of the particular file.

In some arrangements, initially a first portion of a particular data slice of the first LUN holds the particular file that is labeled "cold" and a second portion of the particular data slice of the first LUN holds a set of "hot" files. In such arrangements, the method may further include invalidating the first portion of the particular data slice of the first LUN that holds the particular file that is labeled "cold" and maintaining, as valid, the second portion of the particular data slice of the first LUN that holds the set of "hot" files.

Another embodiment is directed to data storage equipment which includes a host interface operative to communicate with a set of host computers, a storage interface operative to communicate with multiple data storage tiers including a SSD storage tier formed from SSD memory and a HDD storage tier formed from HDD memory, control memory, and control circuitry coupled to the host interface, the storage interface, and the control memory. The control memory stores instructions which, when carried out by the control circuitry, cause the control circuitry to:

(A) provision a first LUN with slice locations from a heterogeneous storage pool created from the SSD storage tier and the HDD storage tier;

(B) provision a second LUN with slice locations from the heterogeneous storage pool; and (C) while different LUN level policies are applied to the first LUN and the second LUN, move file data of a file system from the slice locations of the first LUN to the slice locations of the second LUN, the file system being continuously accessible to the set of host computers through the host interface while the file data of the file system is moved.

In some arrangements, the control circuitry, when conveying the file data from the slice locations of the first LUN to the slice locations of the second LUN based on the ascertained activity levels, is operative to:

(i) perform a deduplication operation to deduplicate data from a particular file and perform a compression operation to compress the data from the particular file before writing the data from the particular file to the second LUN, and (ii) upon writing the data from the particular file to the second LUN, delete the particular file from the first LUN to enable reuse of a set of slice locations of the first LUN that had previously stored the particular file.

Another embodiment is directed to a computer program product having a non-transitory computer readable medium which stores a set of instructions to manage file data of a file system. The set of instructions, when carried out by computerized circuitry, causing the computerized circuitry to perform a method of:

(A) provisioning a first LUN with slice locations from a heterogeneous storage pool created from a SSD storage tier formed from SSD memory and a HDD storage tier formed from HDD memory;

(B) provisioning a second LUN with slice locations from the heterogeneous storage pool; and (C) while different LUN level policies are applied to the first LUN and the second LUN, moving file data of a file system from the slice locations of the first LUN to the slice locations of the second LUN.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in managing a file system within multiple LUNs while different LUN level policies are applied to the LUNs.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to managing file data of a file system within multiple logical units of storage (LUNs) while different LUN level policies are applied to the LUNs. Along these lines, a first policy may be applied to a first LUN which prefers storing active (or "hot") slices of data in a high performance storage tier. Additionally, a second policy may be applied to a second LUN which prefers storing slices of data in the lowest available tier for cost effectiveness. Furthermore, active files of the file system can remain intact and can be placed within the first LUN for quick access, while inactive files of the file system can be replaced with (i) stub files which are placed in the first LUN and (ii) content files which are placed in the second LUN. With the content files containing file content from the inactive files, and the stub files pointing to the content files as well as representing the inactive files, the overall structure of the file system remains intact. Such a technique enables effective auto-tiering at the file level where data slices containing active file data migrate to a higher performance storage tier and data slices containing inactive file data migrate to a cost effective lower performance storage tier in response to application of the different LUN level policies.

Figure 1:
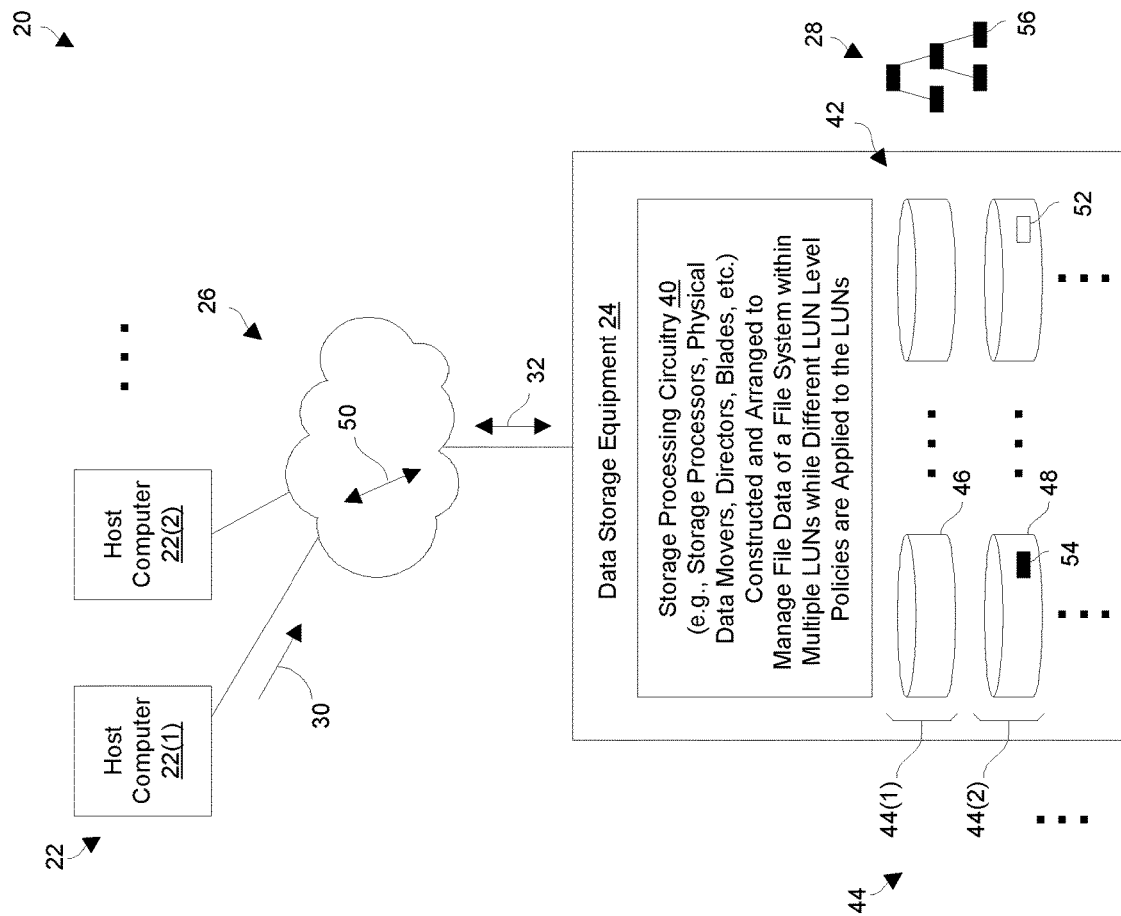
FIG. 1 is a block diagram of a data storage environment which enables effective auto-tiering at the file level.

FIG. 1 shows a data storage environment 20 which enables effective auto-tiering at the file level in accordance with certain example embodiments. The data storage environment 20 includes a set of host computers 22(1), 22(2), . . . (collectively, host computers 22), data storage equipment 24, and a communications medium 26.

Each host computer 22 is constructed and arranged to perform useful work. For example, one or more of the host computers 22 may operate as a web server, a file server, an email server, an enterprise server, combinations thereof, and so on, which provides I/O requests 30 to the data storage equipment 24. In this context, the I/O requests 30 may be requests for all or part of individual files of one or more file systems 28. In some arrangements, the host computers 22 may provide a variety of different I/O requests 30 (e.g., file access requests, block-based access requests, combinations thereof, etc.) that direct the data storage equipment 24 to store and retrieve host data 32 within the one or more file systems 28 on behalf of the host computers 22.

The data storage equipment 24 includes storage processing circuitry 40 and a hybrid data storage array 42 having data storage tiers 44(1), 44(2), . . . (collectively, storage tiers 44) formed of different types of data storage media. The storage processing circuitry 40 may include one or more physical storage processors or engines, data movers, director boards, blades, I/O modules, storage drive controllers, switches, other hardware, combinations thereof, and so on. The storage processing circuitry 40 is constructed and arranged to provide a variety of data storage system services. For example, the storage processing circuitry 40 applies a set of LUN level policies when responding to the I/O requests 30 from the host computers 22. Such an application of the set of LUN level policies enables the storage processing circuitry 40 to make effective data placement and/or relocation decisions and thus robustly and reliably manage the host data 32 within the hybrid array 42.

Each data storage tier 44 of the hybrid array 42 includes multiple storage devices (illustrated using disk symbols in FIG. 1). Although only two storage tiers 44 are shown in FIG. 1 for simplicity, it should be understood that the hybrid array 42 may include a different number of storage tiers 44 (e.g., three, four, etc.). Furthermore, the storage devices that form such tiers 44 may differ in terms of architecture (e.g., single-level cell solid state devices or SSDs, multi-level cell SSDs, magnetic disk, etc.), speed (e.g., 7200 RPM, 10,000 RPM, etc.), usage/adapter category (e.g., SAS, NL-SAS, etc.), storage capacity, power consumption, RAID level, and so on.

At least one data storage tier 44 (e.g., the data storage tier 44(1)) includes a set of SSD storage components 46. Each SSD storage component 46 includes at least one SSD device (or simply SSD) that provides fast access to non-volatile storage. One should appreciate that such SSD storage is generally faster (i.e., shorter response times when reading and/or writing data) but typically more expensive than HDD storage.

Additionally, at least one data storage tier 44 (e.g., the data storage tier 44(2)) includes a set of hard disk drive (HDD) storage components 48. Each HDD storage component 48 includes at least one HDD device (or simply HDD) that provides access to non-volatile storage. One should appreciate that such HDD storage is generally slower (i.e., longer response times when reading and/or writing data) but typically less expensive than SSD storage.

The various storage tiers 44 contribute slice locations to heterogeneous pools of storage slices. That is, each heterogeneous pool includes storage slices formed by different types of storage media such as storage slices formed by SSD memory as well as storage slices formed by HDD memory.

With the various storage tiers 44 offering different storage characteristics such as different data access times, storage capacities, etc., the data storage equipment 24 is able to perform smart and effective data placement/relocation as well as a variety of other services (e.g., deduplication, compression, etc.). As will be explained in further detail shortly, the storage processing circuitry 40 of the data storage equipment 24 provisions LUNs with storage slices from the hetergeneous pools and applies different LUN level policies to different LUNs to relocate file data of a file system 28 among the different LUNs. Such operation enables effective auto-tiering at the file level where active file data of the file system 28 moves to the data storage tier 44 that includes the SSDs, and inactive file data of the file system 28 moves to the data storage tier 44 that includes the HDDs.

The communications medium 26 is constructed and arranged to connect the various components of the data storage environment 20 together to enable these components to communicate via exchanging electronic signals 50 (e.g., see the double arrow 50). At least a portion of the communications medium 26 is illustrated as a cloud to indicate that the communications medium 26 is capable of having a variety of different topologies including backbone, hub-and-spoke, fabric, loop, irregular, combinations thereof, and so on. Along these lines, the communications medium 26 may include copper-based data communications devices and cabling, fiber optic communications devices and cabling, wireless communication devices, combinations thereof, etc. Furthermore, the communications medium 26 is capable of supporting NAS-based communications, SAN-based communications, cellular communications, WAN-based communications, LAN-based communications, distributed infrastructure communications, other topologies, combinations thereof, etc.

During operation, the storage processing circuitry 40 of the data storage equipment 24 provisions LUNs with unused slice locations (i.e., storage slices) 52 that are available to hold data slices 54. The storage processing circuitry 40 then provides one or more of the host computers 22 with access to a file system 28 residing within the LUNs. The file system 28 includes files 56 that are arranged in an inverted tree hierarchy (e.g., via folders containing files and other sub-folders, etc.).

When a host computer 22 writes host data 32 to a file 56 of the file system 28, the host computer 22 may provide one or more I/O requests 30 to the data storage equipment 24, and the storage processing circuitry 40 of the data storage equipment 24 responds by writing the host data 32 into one or more slice locations 52 within the hybrid array 42. Similarly, when a host computer 22 reads host data 32 from a file 56 of the file system 28, the host computer 22 may provide one or more I/O requests 30 to the data storage equipment 24, and the storage processing circuitry 40 responds by reading the host data 32 from one or more slice locations 52 within the hybrid array 42.

In some arrangements, the slice locations 52 are relatively large extents of non-volatile addressable memory of a uniform size (e.g., 128 MB, 256 MB, 512 MB, 1 GB, etc.). Accordingly, the data slice 54 residing in each slice location 52 may be large enough to hold several files 56 at once. For example, if the slice locations 52 are 256 MB in size, a data slice 54 residing within a slice location 52 may hold about 100 files that are 2 MB in size on average.

As the host computers 22 access the file system 28, the storage processing circuitry 40 monitors activity levels of the files 56 and of data slices 54 residing in the slice locations 52. Such activity level monitoring of the files 56 enables the storage processing circuitry 40 to identify active (e.g., "hot") files 56 and inactive (e.g., "cold") files 56 (e.g., based on how recently the files 56 were accessed). Additionally, such activity level monitoring of data slices 54 enables the storage processing circuitry 40 to identify active (e.g., "hot" labeled) data slices 54 and inactive (e.g., "cold" labeled) data slices 54 containing file data of the file system 28 (e.g., based on how frequently the data slices 54 are accessed during a period of time).

Furthermore, the storage processing circuitry 40 applies different LUN level policies to the LUNs that hold the file system 28. In particular, to a first LUN, the storage processing circuitry 40 applies a first policy which prefers storing active (or "hot") slices of data in a high performance storage tier. Additionally, to a second LUN, the storage processing circuitry 40 applies a second policy which prefers storing slices of data in the lowest available tier for cost effectiveness.

In such a situation, active files 56 of the file system 28 can remain intact and can be placed within the first LUN for quick access. Additionally, inactive files 56 of the file system 28 can be replaced with (i) stub files which are placed in the first LUN and (ii) content files which are placed in the second LUN. With the content files containing file content from the inactive files, and the stub files pointing to the content files as well as representing the inactive files, the overall structure of the file system 28 remains preserved. Moreover, since the storage processing circuitry 40 relocates data slices 54 that hold the file data in accordance with the LUN level policies, the storage processing circuitry 40 is able to achieve effective auto-tiering at the file level where data slices 54 containing active file data move to the higher performance storage tier 44 and data slices 54 containing inactive file data move to the more cost effective lower performance storage tier 44. Further details will now be provided with reference to FIG. 2.

Figure 2:
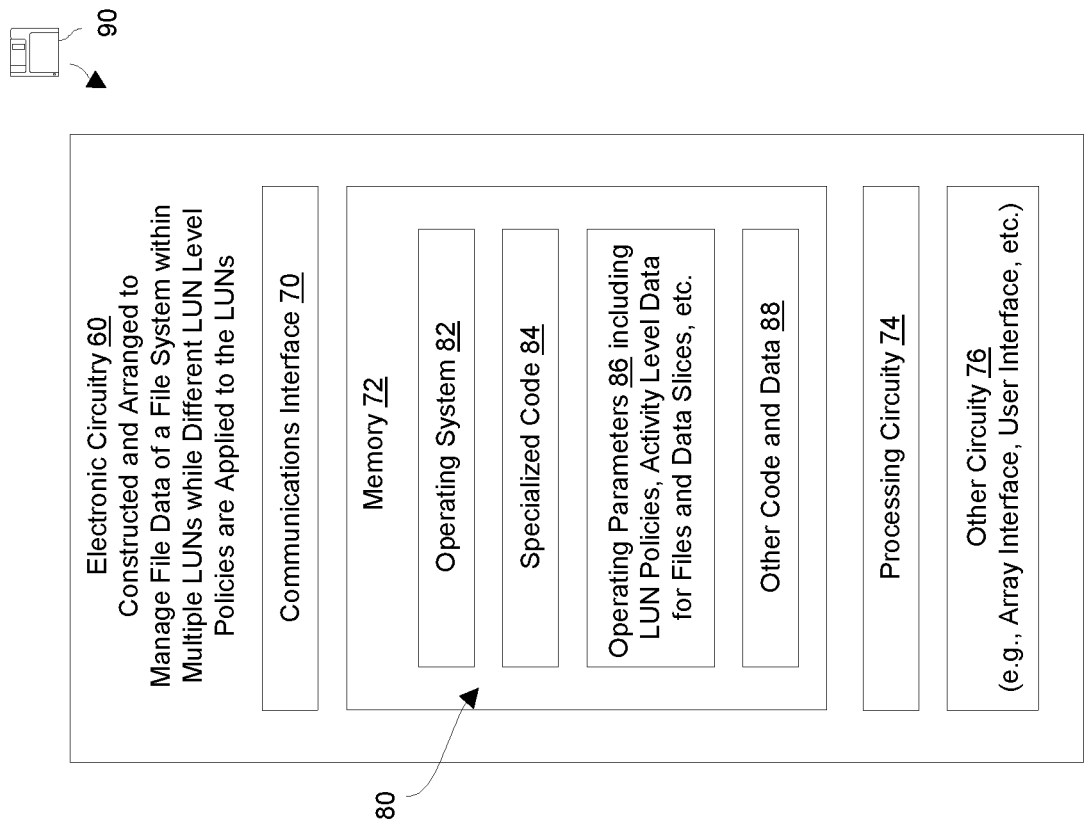
FIG. 2 is a block diagram of data storage equipment of the data storage environment of FIG. 1 in accordance with certain example embodiments.

FIG. 2 shows electronic circuitry 60 which is suitable for the storage processing circuitry 40 that enables effective auto-tiering at the file level (also see FIG. 1). As shown in FIG. 2, the electronic circuitry 60 includes a communications interface 70, memory 72, processing circuitry 74, and other circuitry 76.

The communications interface 70 is constructed and arranged to connect the data storage equipment 24 to the communications medium 26 (FIG. 1) to enable electronic communications with other devices of the data storage environment 20 (e.g., the host computers 22). Such communications may be IP-based, SAN-based, cellular-based, cable-based, fiber-optic based, wireless, cloud-based, combinations thereof, and so on. Accordingly, the communications interface 70 enables the data storage equipment 24 to robustly and reliably communicate with other apparatus.

The memory 72 is intended to represent both volatile storage (e.g., DRAM, SRAM, etc.) and non-volatile storage (e.g., flash memory, magnetic memory, etc.). In some arrangements, the memory 72 utilizes a portion of the hybrid array 42 (FIG. 1). The memory 72 stores a variety of software constructs 80 including operating system code 82, specialized code 84, operating parameters 86, as well as other code and data 88.

The operating system code 82 refers to an operating system which is involved in controlling various electronic resources of the data storage equipment 24. Along these lines, the operating system manages/allocates various electronic resources such as processor cycles, memory space, application installations, access control and privileges, and so on.

The specialized code 84 refers to the instructions that are involved in data storage operations (e.g., file access operations) as well as other operations such as deduplication, compression, and so on. The specialized code 84 may include operating variables and data structures, drivers, other metadata, etc. that form one or more portions of the I/O stack, mapping tables, and so on. In some arrangements, the specialized code 84 is tightly integrated with the operating system code 82 (e.g., a kernel).

The operating parameters 86 refer to a variety of settings, policies, logged events, instructions, parameters, other data, and so on. Along these lines, the operating parameter 86 may dictate particular LUN level policies, LUN configurations, LUN states, etc. Furthermore, the operating parameters 86 may include monitored events, thresholds, counters that tally the number of times files 52 and data slices 56 are accessed, timestamps of when the files 52 and the data slices 56 are accessed, other data, etc. that enable the electronic circuitry 60 to identify active and inactive files, and active and inactive data slices 54.

The other code and data 88 refers to various other data, etc. For example, the electronic circuitry 60 may be equipped with other tools and utilities, user-level applications, and so on.

The processing circuitry 74 is constructed and arranged to operate in accordance with the various software constructs 80 stored in the memory 72. As will be explained in further detail shortly, the processing circuitry 74 executes code of the various software constructs 80 to form specialized circuitry that concurrently carries out data storage operations as well as LUN level policies that enable effective and efficient auto-tiering at the file level within the hybrid array 42.

Such processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, DVD, flash memory, disk memory, tape memory, and the like.

The other circuitry 76 represents additional hardware. For example, the other circuitry 76 may include a storage drive (or array) interface to communicate with the SSDs, HDDs, and so on (e.g., via SATA, SAS, PCIe, etc.). As another example, the other circuitry 76 may include a user terminal or service processor that enables a human user to control and/or configure the data storage equipment 24, and so on. Further details will now be provided with reference to FIGS. 3 through 5.

Figure 3:
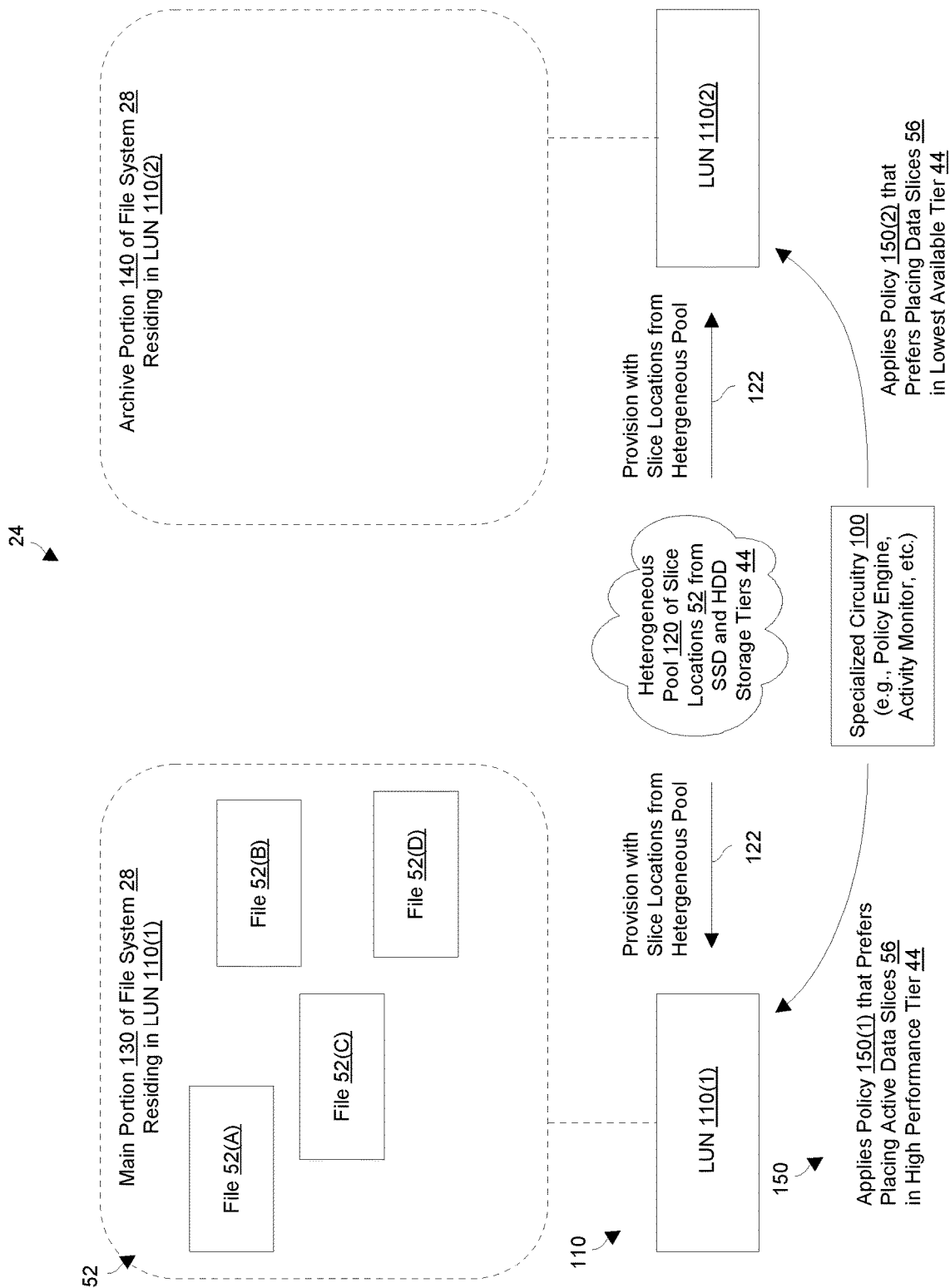
FIG. 3 is a block diagram illustrating particular details of the data storage environment at a first operating time in accordance with certain example embodiments.
Figure 4:
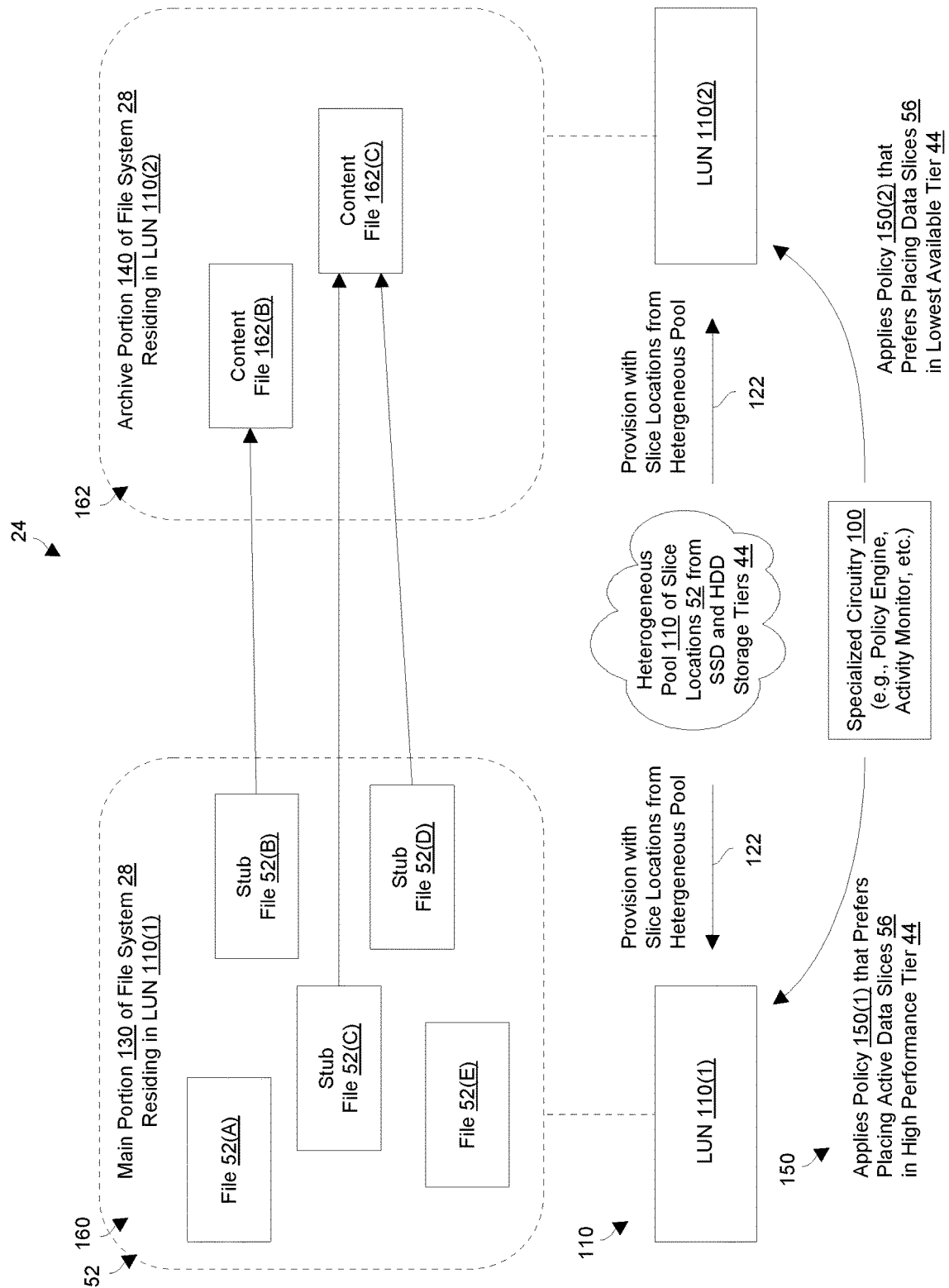
FIG. 4 is a block diagram illustrating particular details of the data storage environment at a second operating time in accordance with certain example embodiments.
Figure 5:
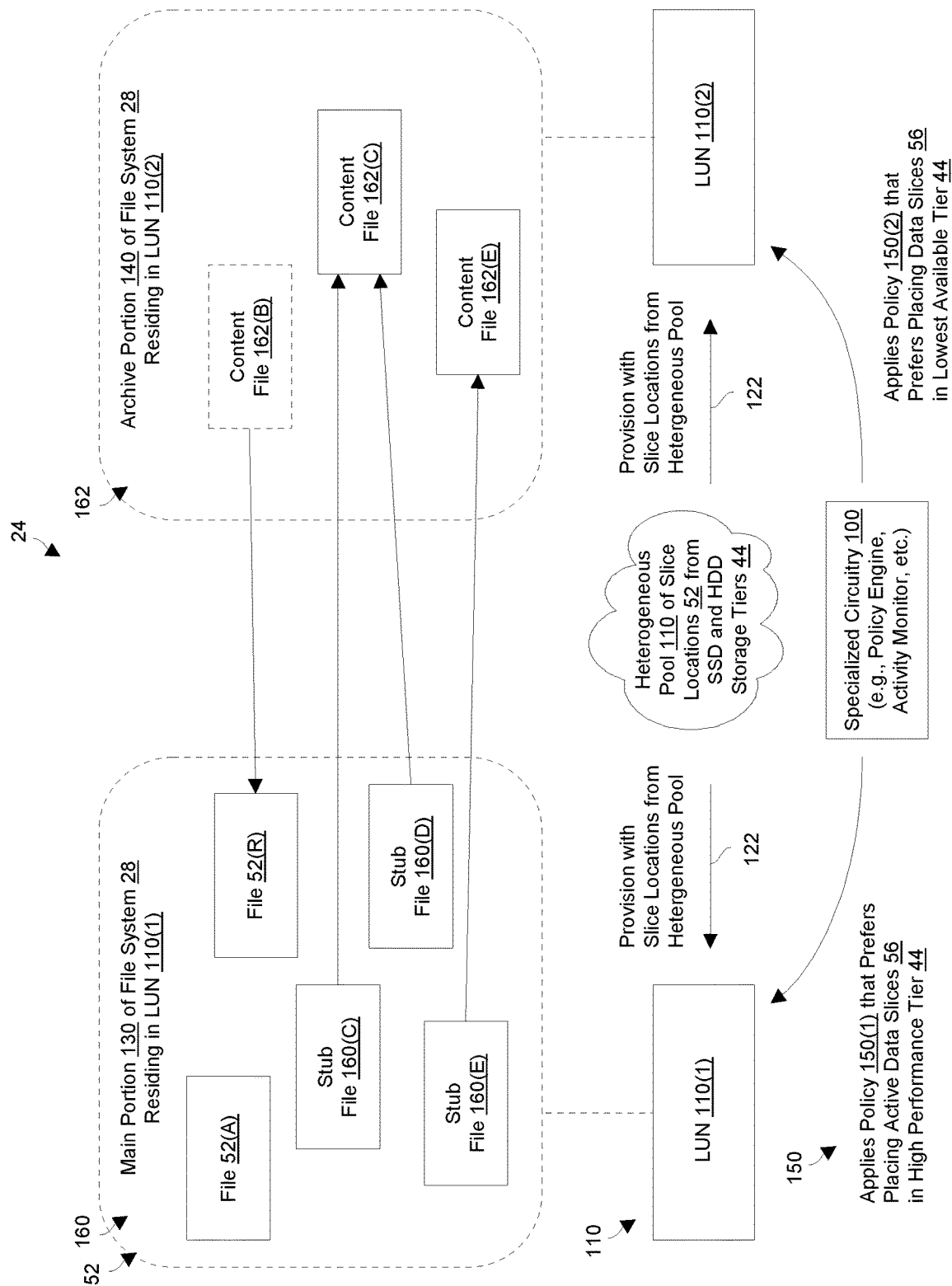
FIG. 5 is a block diagram illustrating particular details of the data storage environment at a third operating time in accordance with certain example embodiments.

FIGS. 3 through 5 show particular details of the data storage environment 20 during different times of operation. FIG. 3 shows particular details during a first operating time. FIG. 4 shows particular details during a second operating time that is after the first operating time. FIG. 5 shows particular details during a third operating time that is after the second operating time.

As shown in FIG. 3, specialized circuitry 100 applies tiering policies to multiple LUNs 110. Such specialized circuitry 100 may be formed by the processing circuitry 74 operating in accordance with the software constructs 80 stored in the memory 72 (also see FIG. 2). The specialized circuitry 100 is operative to apply different LUN level policies to LUNs 110(1), 110(2) (collectively, LUNs 110) and monitor activity levels of data slices 52 and files 56, among other things (also see FIG. 1).

As further shown in FIG. 3, the specialized circuitry 100 provisions the LUNs 110 with available slice locations 52 from a heterogeneous pool 120 of slice locations (i.e., storage slices) 52 from the different storage tiers 44 (see the arrows 112). In particular, the heterogeneous pool 120 includes slice locations 52 within a storage tier 44 of SSD memory and slice locations 52 within another storage tier 44 of HDD memory. Such provisioning may occur at the onset of operation of the data storage equipment 24 (FIG. 1) and/or in real-time in response to the need for actual storage (e.g., via thin LUN provisioning). As a result of such provisioning, the LUN 110(1) provides storage that holds a main portion 130 of a file system 28 and the LUN 110(2) provides storage that holds an archive portion 140 of a file system 28 (see dashed areas). Further details of the main portion 130 and the archive portion 140 will be provided shortly.

At this point, it should be understood that the different LUN level policies that are applied by the specialized circuitry 100 to the LUNs are slice-based, i.e., the LUN level policies direct how data slices 56 are to be relocated among slice locations 52 of the storage tiers 44. In particular, to the LUN 110(1), the specialized circuitry 100 applies a policy 150(1) that prefers placing active data slices 56 in a high performance tier 44. In some arrangements, the policy 150(1) prefers placing the most active data slices 56 in the highest performance tier 44 (e.g., SSD memory), and the data slices 56 are evicted from the highest performance tier 44 only when the capacity limit of the highest performance tier 44 has been reached. In other arrangements, the policy 150(1) prefers placement of active or "hot" labeled data (e.g., data which has been accessed more than a certain number of times within a set time period) in the highest performance tier 44 while the rest of the data remains in a lower tier 44. Other policies 150(1) that prefer placing active data slices 56 in a high performance tier 44 (e.g., start high then auto-tier, etc.) are suitable for use as well.

Furthermore, to the LUN 110(2), the specialized circuitry 100 applies a policy 150(2) that prefers placing data slices 56 in the lowest available tier 44. In some arrangements, the policy 150(2) prefers placing all data slices 56 initially in the lowest performance tier 44 (e.g., HDD memory), and the data slices 56 are promoted from the lowest performance tier 44 only when the capacity limit of the lowest performance tier 44 has been reached. Other policies 150(2) that prefer placing data slices 56 in a low performance tier 44 are suitable for use as well.

It should be further understood that the data slices 56 that reside within the LUNs 110 hold file data that represents the file system 28. For example, each data slice 56 may hold a portion of a file 52, just one file 52, or multiple files 52. Moreover, the files 52 may have a variety of different types (e.g., text files, video files, database files, folders, etc.). As such, specialized circuitry 100 may maintain timestamps indicating when each file 52 was last written, read, or otherwise accessed in order to measure or gauge activity for that file 52. Along these lines, a file 52 that has been accessed within a predefined amount of time (e.g., within the last hour, the last five days, the last month, etc.) may be considered or labeled active. However, a file 52 that has not been accessed within the predefined amount of time may be considered or labeled inactive.

With reference back to FIG. 3 and by way of example only, four files 52(A), 52(B), 52(C), 52(D) of the file system 28 initially reside within the main portion 130 that sits within the LUN 110(1). It should be understood that the specialized circuitry 100 may initially place all new files 52 in the main portion 130 because all new files 52 may be considered as having just been accessed. Then, the specialized circuitry 100 may continue to evaluate each file 52 by comparing a time in which that file 52 was last accessed to a threshold amount of time, labeling that file 52 as "hot" when the time is less than the threshold, and labeling that file 52 as "cold" when the time is greater than the threshold.

Additionally, since the specialized circuitry 100 applies the policy 150(1) that prefers placing active data slices 56 in a high performance tier 44 to the LUN 110(1), the specialized circuitry 100 relocates the active data slices 56 in the high performance tier 44 (e.g., see the storage tier 44(1) in FIG. 1), and inactive data slices 56 in a lower performance tier 44 (e.g., see the storage tier 44(2) in FIG. 1). Accordingly, "hot" data migrates to the high performance tier 44 and "cold data migrates to the low performance tier 44.

As shown in FIG. 4 and as time passes, the specialized circuitry 100 may deem certain files 52 as inactive based on activity level. For each inactive file 52, the specialized circuitry 100 replaces that file 52 with a stub file 160 and a content file 162. The specialized circuitry 100 locates the stub file 160 in the main portion 130 of the file system 28, and locates the content file 162 in the archive portion 140 of the file system 28. The specialized circuitry 100 then removes the inactive file 52 from the main portion 130. The content file 162 holds the content of the inactive file 52 that was removed. The stub file 160 takes the place of the inactive file 52 that was removed and occupies less space (e.g., only enough space to function as a place holder and to point to or identify the content file 162 in the archive portion 140).

By way of example, the file 52(B) was deemed inactive and replaced with the stub file 160(B) and the content file 162(B). Similarly, the file 52(C) was deemed inactive and replaced with the stub file 160(C) and the content file 162(C). Accordingly, space within the LUN 110(1) and particularly within the high performance tier 44 is freed for re-use. Moreover, content of the inactive files 52 now safely resides within the LUN 110(2) and particularly within the low performance tier 44. As a result, the specialized circuitry 100 has performed effective and efficient file level auto-tiering.

It should be understood that, as the specialized circuitry 100 carries out replacement of the inactive files 52 with stub files 160 and content files 162, the specialized circuitry 100 continues to monitor activity of both files 52 and data slices 56, as well as apply the LUN level policies 150 to the LUNs 110. Furthermore and as shown in FIG. 4, the file 52(A) is not replaced by a stub file 160 and a content file 162 because the specialized circuitry 100 considers the file 52(A) to still be active, e.g., by comparing a time in which that file 52(A)

was last accessed to a threshold, labeling that file as "hot" when the time is less than the threshold, and labeling that file as "cold" when the time is greater than the threshold.

In certain embodiments, the specialized circuitry 100 performs other operations during the process of replacing an inactive file 52 with a stub file 160 and a content file 162. For example, when the file 52(D) in FIG. 3 becomes inactive, the specialized circuitry 100 may a perform deduplication operation to determine whether a copy of the content in the file 52(D) already exists somewhere within the LUNs 110. By way of example, the specialized circuitry 100 determines that the content of the file 52(D) is the same as the content within the content file 162(C) and thus only creates a stub file 160(D) which points to the content file 162(C) before removing the file 52(D). The specialized circuitry 100 may perform other operations as well such as data compression of content before it is placed within a content file 162, compression of content files 162, as well as other optimizations.

Also, by way of example, the specialized circuitry 100 has added a new file 52(E) to the main portion 130 of the file system 28. Along these lines, the new file 52(E) may occupy memory that was originally occupied by one or more of the inactive files 52(B), 52(C) that has been deleted from the main portion 130.

As shown in FIG. 5 and by way of example only, the specialized circuitry 100 still considers the file 52(A) to be active based on monitored activity level for that file 52(A). Additionally, the specialized circuitry 100 now considers the file 52(E) to be inactive and thus replaces the file 52(E) with a stub file 160(E) and a content file 162(E). Furthermore, the specialized circuitry 100 has restored the stub file 160(B) and the content file 162(B) with a regular file 52(R), e.g., perhaps after a host computer 22 (FIG. 1) has modified certain file contents, e.g., the file data of the original file 52(B) (FIG. 3).

It should be understood that a similar mechanism for replacing an ordinary file with a stub file and a content file is described within a document entitled "EMC Celerra Automated Storage Tiering", by EMC Corporation and dated 2009, the entire contents and teachings of which are hereby incorporated by reference. It should be further understood that other archiving mechanisms are suitable for use in moving inactive files 52 and/or contents of inactive files 52 from the LUN 110(1) to the LUN 110(2). Further details will now be provided with reference to FIG. 6.

Figure 6:
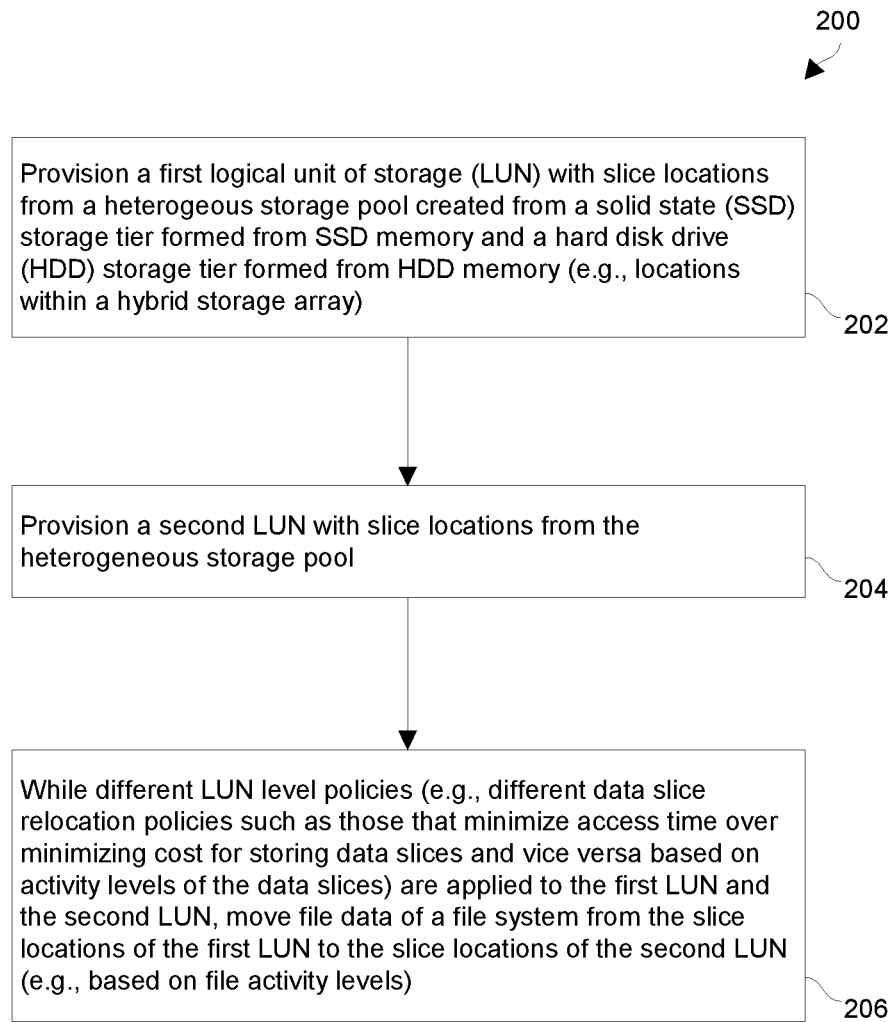
FIG. 6 is a flowchart of a procedure which is performed by the data storage equipment of FIG. 2.

FIG. 6 is a flowchart of a procedure 200 for managing file data of a file system in a manner that enables effective auto-tiering at the file level in accordance with certain example embodiments. Such procedure 200 may be performed by control circuitry of data storage equipment (e.g., also see FIG. 1).

At 202, the control circuitry provisions a first LUN with slice locations from a heterogeneous storage pool created from a SSD storage tier formed from SSD memory and a HDD storage tier formed from HDD memory.

At 204, the control circuitry provisions a second LUN with slice locations from the heterogeneous storage pool.

At 206, while different LUN level policies are applied to the first LUN and the second LUN, the control circuitry moves file data of a file system from the slice locations of the first LUN to the slice locations of the second LUN (also see FIGS. 3 through 5). Such LUN level policies may be sets of rules that relocate data slices among the LUNs based on data slice activity levels. In some arrangements, the control circuitry applies a policy to the first LUN that prefers placing active data slices in a high performance tier, and a different policy to the second LUN that prefers placing data slices in the lowest available tier.

Additionally, the criteria for moving file data of the file system from one LUN to the other LUN may be based on file activity level (e.g., labeling files as "hot" or "cold" based on usage data and transferring content from cold files to the other LUN). In some arrangements, the control circuitry replaces a cold or inactive file (e.g., a file that has not been accessed for a predefined amount of time) with a stub file in the first LUN and a content file in the second LUN where the content file holds the content of the cold file and the stub file points to (or otherwise identifies) the content file. Moreover, during such file replacement, the control circuitry may perform a variety of optimization operations such as deduplication and/or compression.

It should be understood that moving inactive file data out of the first LUN and into the second LUN frees space within the first LUN. If the first LUN prefers placing active data slices in a high performance tier, then more space will now be available in that tier for other active data slices (e.g., file data of active files).

Furthermore, moving inactive file data out of the first LUN and into the second LUN positions consumes more space in the second LUN. If the second LUN prefers placing data slices in a lowest available tier, then inactive file data will consume more cost effective memory.

It should be understood that activities 202 and 204 may be performed in a different order or concurrently. In some arrangements, activities 202 and 204 are performed in an ongoing manner (e.g., allocation in real-time/continuously in response to demand such as via thin LUN provisioning).

As mentioned above, an improved technique is directed to managing file data of a file system 28 within multiple LUNs 110 while different LUN level policies are applied to the LUNs 110. For example, a first policy may be applied to a first LUN 110(1) which prefers storing active (or "hot") slices of data 54 in a high performance storage tier 44. Additionally, a second policy may be applied to a second LUN 110(2) which prefers storing slices of data 54 in the lowest available tier for cost effectiveness. Furthermore, active files 52 of the file system 28 can remain intact and can be placed within the first LUN 110(1) for quick access, and inactive files 52 of the file system 28 can be replaced with stub files 160 which are placed in the first LUN 110(1) and content files 162 which are placed in the second LUN 110(2). With the content files 162 containing the content from the inactive files 52, and with the stub files 160 pointing to (or identifying) the content files 162 as well as representing the inactive files 52, the overall structure of the file system 28 remains intact. Moreover, slices of data 54 containing active file data move naturally to the high performance storage tier 44 and slices of data containing inactive file data move naturally to the lowest available tier 44 thus optimizing operation.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

One should appreciate that the above-described techniques do not merely manage data. Rather, the disclosed techniques involve improvements to the technology. Along these lines, with the above-described techniques, the data storage equipment 24 is able to implement more effective and efficient auto-tiering at the file level, smart file data placement based on activity level, preservation of file system hierarchy, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

Furthermore, it should be understood that hybrid arrays are provisioned with drives of different types. Some types may be dedicated to storing the performance critical part of the working set while other types are dedicated to provide less expensive capacity for the rest of the set. An example, of a first drive type is SSD and the example of the later drive type is near-line SAS (NL-SAS).

LUNs may be exported to the user by the array and mapped, where different regions of the logical address space are mapped to the different regions of the physical space on the different drives. Additionally, some software on the array may periodically remap the LUNs to keep the most actively used parts of them on the fastest drives to maximize the array performance (e.g., via one or more auto-tiering policies). Furthermore, user file systems may be built on the top of LUNs.

Along these lines, a file can be written and then actively used for some period of time. It is beneficial if such a new file is allocated on the fastest drives (e.g., a tier of SSDs). After some initial period of high activity, the file may not be accessed very much if at all and, thus, can be moved to the drives with the cheapest capacity (e.g., a tier of NL-SAS drives).

However, in conventional systems, auto-tiering functionality is ineffective in handling this case directly. In particular, the size of the LUN region which can be remapped is usually quite big, e.g., 256 MB data slices. This region is given to the file system and can used to hold multiple files. Since it is possible that different files are at the different stage of the lifecycle, some files within a particular data slice will be new and accessed frequently and other files within the particular data slice will be old and perhaps not accessed at all. Nevertheless, a convention system will see that the average amount of I/O coming to the data slice is high and thus will place the data slice on the fastest drives. Such operation is unnecessarily inefficient and costly.

However, with the improvements disclosed herein, effective and efficient auto-tiering can be performed at the file level. In accordance with some embodiments, the file system consumes space from two LUNs with different auto-tiering policy. In particular, the first LUN has a policy that places active data slices on the fastest drives. The second LUN has a more or less opposite policy that places data slices on the most cost effective drives.

During operation, the file system uses the first LUN as the default storage. Furthermore, a policy engine tracks the accesses to the files of the file system and identifies files (or file data) that can be moved to the other LUN, e.g., files that have not been accessed for some period of time.

In a moving process for an inactive file, file data may be moved transparently to a hidden part of the file system located on the second LUN. In particular, a stub file (or simply stub) is created at the file's original location pointing to the new location. The content of the inactive file is placed within a content file in the second LUN (e.g., NL-SAS). Accordingly, the file content is effectively moved to from high performance memory to cost effective memory.

Also, the circuitry of the data storage system can retrieve the file content back to the first LUN (e.g., the default space) once the file starts being accessed frequently. As the result the file system is auto-tiered at the single file level.

In some embodiments, the circuitry of the data storage system further applies deduplication and/or compression to the archive portion of the file system. In some arrangements, the file content is deduplicated and/or compressed as the content is moved to the archive part. In other arrangements, the file content is moved to the archive part first, and is then deduplicated and/or compressed later on (e.g., after some other period of being not accessed). It should be understood the same policy engine that applies the tiering policies may also perform deduplication and/or compression.

Additionally, it should be understood that the above-described techniques applied different LUN level policies to storage tiers 44 of a hybrid array 42. In some embodiments, each storage tier 44 may be SSD memory but differ in SSD type or SSD speed, etc. Likewise, each storage tier 44 may be HDD memory but differ in HDD speed, format, RAID level, etc. Such modifications and enhancements are intended to belong to various embodiments of the disclosure.

What is claimed is:

1. In a data storage system, a method of managing file data of a file system, the method comprising:
provisioning a first logical unit of storage (LUN) with slice locations from a heterogeneous storage pool created from a solid state device (SSD) storage tier formed from SSD memory and a hard disk drive (HDD) storage tier formed from HDD memory;
provisioning a second LUN with slice locations from the heterogeneous storage pool;
while different LUN level policies are applied to the first LUN and the second LUN, moving file data of a file system from the slice locations of the first LUN to the slice locations of the second LUN; and
prior to moving the file data of the file system from the slice locations of the first LUN to the slice locations of the second LUN, initiating application of (i) a first data slice relocation policy to the first LUN to move data slices of the first LUN among the SSD storage tier and the HDD storage tier and (ii) a second data slice relocation policy to the second LUN to move data slices of the second LUN among the SSD storage tier and the HDD storage tier, the first data slice relocation policy and the second data slice relocation policy being the different LUN level policies that are applied to the first LUN and the second LUN;

wherein initiating application of the first data slice relocation policy to the first LUN includes applying, to the first LUN, a first set of rules that prioritizes minimizing access time for accessing data slices over minimizing cost for storing data slices; and wherein initiating application of the second data slice relocation policy to the second LUN includes applying, to the second LUN, a second set of rules that prioritizes minimizing cost for storing data slices over minimizing access time for accessing data slices.

2. A method as in claim 1 wherein moving the file data of the file system from the slice locations of the first LUN to the slice locations of the second LUN includes:

ascertaining activity levels of files of the file system, and conveying the file data from the slice locations of the first LUN to the slice locations of the second LUN based on the ascertained activity levels.

3. A method as in claim 2 wherein ascertaining the activity levels of files of the file system includes for each file of the file system:

comparing a time in which that file was last accessed to a threshold, labeling that file as "hot" when the time is less than the threshold, and labeling that file as "cold" when the time is greater than the threshold.

4. A method as in claim 3 wherein conveying the file data from the slice locations of the first LUN to the slice locations of the second LUN includes:

for particular files that are labeled "cold", creating stub files and content files from the particular files and, in place of the particular files, placing the stub files in the first LUN and placing the content files in the second LUN while files that are labeled "hot" remain in the first LUN.

5. A method as in claim 3 wherein conveying the file data from the slice locations of the first LUN to the slice locations of the second LUN includes:

for a particular file that is labeled "cold", creating a stub file and a content file from the particular file and, in place of the particular file, placing the stub file in the first LUN and placing the content file in the second LUN, the stub file being operative to identify the content file, and the content file containing content of the particular file.

6. A method as in claim 5, further comprising:
before the content file containing the content of the particular file is placed in the second LUN, performing a deduplication operation to deduplicate the content of the particular file.

7. A method as in claim 6, further comprising:
before the content file containing the content of the particular file is placed in the second LUN, performing a compression operation to compress the content of the particular file.

8. A method as in claim 5 wherein initially a first portion of a particular data slice of the first LUN holds the particular file that is labeled "cold" and a second portion of the particular data slice of the first LUN holds a set of "hot" files; and wherein the method further comprises:
invalidating the first portion of the particular data slice of the first LUN that holds the particular file that is labeled "cold" and maintaining, as valid, the second portion of the particular data slice of the first LUN that holds the set of "hot" files.

9. A method as in claim 2 wherein conveying the file data includes:

performing a deduplication operation to deduplicate data from a particular file and perform a compression operation to compress the data from the particular file before writing the data from the particular file to the second LUN, and upon writing the data from the particular file to the second LUN, deleting the particular file from the first LUN to enable reuse of a set of slice locations of the first LUN that had previously stored the particular file.

10. Data storage equipment, comprising:
a host interface operative to communicate with a set of host computers;
a storage interface operative to communicate with multiple data storage tiers including a solid state device (SSD) storage tier formed from SSD memory and a hard disk drive (HDD) storage tier formed from HDD memory;
control memory; and
control circuitry coupled to the host interface, the storage interface, and the control memory, wherein the control memory stores instructions which, when carried out by the control circuitry, cause the control circuitry to:
provision a first logical unit of storage (LUN) with slice locations from a heterogeneous storage pool created from the SSD storage tier and the HDD storage tier;
provision a second LUN with slice locations from the heterogeneous storage pool;
while different LUN level policies are applied to the first LUN and the second LUN, move file data of a file system from the slice locations of the first LUN to the slice locations of the second LUN, the file system being continuously accessible to the set of host computers through the host interface while the file data of the file system is moved; and
prior to moving the file data of the file system from the slice locations of the first LUN to the slice locations of the second LUN, initiate application of (i) a first data slice relocation policy to the first LUN to move data slices of the first LUN among the SSD storage tier and the HDD storage tier and (ii) a second data slice relocation policy to the second LUN to move data slices of the second LUN among the SSD storage tier and the HDD storage tier, the first data slice relocation policy and the second data slice relocation policy being the different LUN level policies that are applied to the first LUN and the second LUN; and
wherein the control circuitry, when initiating application of the first data slice relocation policy to the first LUN, is operative to apply, to the first LUN, a first set of rules that prioritizes minimizing access time for accessing data slices over minimizing cost for storing data slices; and
wherein the control circuitry, when initiating application of the second data slice relocation policy to the second LUN, is operative to apply, to the second LUN, a second set of rules that prioritizes minimizing cost for storing data slices over minimizing access time for accessing data slices.

11. Data storage equipment as in claim 10 wherein the control circuitry, when moving the file data of the file system from the slice locations of the first LUN to the slice locations of the second LUN, is operative to:
ascertain activity levels of files of the file system, and convey the file data from the slice locations of the first LUN to the slice locations of the second LUN based on the ascertained activity levels.

12. Data storage equipment as in claim 11 wherein the control circuitry, when conveying the file data from the slice locations of the first LUN to the slice locations of the second LUN based on the ascertained activity levels, is operative to:
perform a deduplication operation to deduplicate data from a particular file and perform a compression operation to compress the data from the particular file before writing the data from the particular file to the second LUN, and
upon writing the data from the particular file to the second LUN, delete the particular file from the first LUN to enable reuse of a set of slice locations of the first LUN that had previously stored the particular file.

13. Data storage equipment as in claim 11 wherein the control circuitry, when ascertaining the activity levels of files of the file system includes for each file of the file system, is constructed and arranged to:
compare a time in which that file was last accessed to a threshold, labeling that file as "hot" when the time is less than the threshold, and labeling that file as "cold" when the time is greater than the threshold.

14. Data storage equipment as in claim 13 wherein the control circuitry, when conveying the file data, is constructed and arranged to:
for particular files that are labeled "cold", create stub files and content files from the particular files and, in place of the particular files, place the stub files in the first LUN and placing the content files in the second LUN while files that are labeled "hot" remain in the first LUN.

15. Data storage equipment as in claim 13 wherein the control circuitry, when conveying the file data, is constructed and arranged to:
for a particular file that is labeled "cold", creating a stub file and a content file from the particular file and, in place of the particular file, placing the stub file in the first LUN and placing the content file in the second LUN, the stub file being operative to identify the content file, and the content file containing content of the particular file.

16. A computer program product having a non-transitory computer readable medium which stores a set of instructions to manage file data of a file system; the set of instructions, when carried out by computerized circuitry, causing the computerized circuitry to perform a method of:
provisioning a first logical unit of storage (LUN) with slice locations from a heterogeneous storage pool created from a solid state device (SSD) storage tier formed from SSD memory and a hard disk drive (HDD) storage tier formed from HDD memory;
provisioning a second LUN with slice locations from the heterogeneous storage pool;
while different LUN level policies are applied to the first LUN and the second LUN, moving file data of a file system from the slice locations of the first LUN to the slice locations of the second LUN; and
prior to moving the file data of the file system from the slice locations of the first LUN to the slice locations of the second LUN, initiating application of (i) a first data slice relocation policy to the first LUN to move data slices of the first LUN among the SSD storage tier and the HDD storage tier and (ii) a second data slice relocation policy to the second LUN to move data slices of the second LUN among the SSD storage tier and the HDD storage tier, the first data slice relocation policy and the second data slice relocation policy being the different LUN level policies that are applied to the first LUN and the second LUN; and
wherein initiating application of the first data slice relocation policy to the first LUN includes applying, to the first LUN, a first set of rules that prioritizes minimizing access time for accessing data slices over minimizing cost for storing data slices; and
wherein initiating application of the second data slice relocation policy to the second LUN includes applying, to the second LUN, a second set of rules that prioritizes minimizing cost for storing data slices over minimizing access time for accessing data slices.

17. A computer program product as in claim 16 wherein moving the file data of the file system from the slice locations of the first LUN to the slice locations of the second LUN includes:
ascertaining activity levels of files of the file system, and
conveying the file data from the slice locations of the first LUN to the slice locations of the second LUN based on the ascertained activity levels.

18. A computer program product as in claim 17 wherein conveying the file data includes:
performing a deduplication operation to deduplicate data from a particular file and perform a compression operation to compress the data from the particular file before writing the data from the particular file to the second LUN, and
upon writing the data from the particular file to the second LUN, deleting the particular file from the first LUN to enable reuse of a set of slice locations of the first LUN that had previously stored the particular file.

19. A computer program product as in claim 17 wherein ascertaining the activity levels of files of the file system includes for each file of the file system:
comparing a time in which that file was last accessed to a threshold, labeling that file as "hot" when the time is less than the threshold, and labeling that file as "cold" when the time is greater than the threshold.

20. A computer program product as in claim 19 wherein conveying the file data from the slice locations of the first LUN to the slice locations of the second LUN includes:
for particular files that are labeled "cold", creating stub files and content files from the particular files and, in place of the particular files, placing the stub files in the first LUN and placing the content files in the second LUN while files that are labeled "hot" remain in the first LUN.

* * * * *